United States Patent
Tang

(10) Patent No.: US 6,507,416 B1
(45) Date of Patent: Jan. 14, 2003

(54) BRIGHTNESS ADJUSTABLE CHASSIS FOR A SCANNER

(75) Inventor: Ricke Tang, Taipei (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/299,088

(22) Filed: Apr. 26, 1999

(51) Int. Cl.$^7$ ................................................. H04N 1/04
(52) U.S. Cl. ...................................... 358/475; 358/497
(58) Field of Search .............................. 358/475, 509, 358/505, 506, 487, 474, 497, 494; 250/234–236, 208.1

(56) References Cited

U.S. PATENT DOCUMENTS

| | | | | |
|---|---|---|---|---|
| 3,574,469 A | * | 4/1971 | Emerson | .................... 356/431 |
| 6,147,343 A | * | 11/2000 | Christensen | ................ 250/234 |
| 6,233,063 B1 | * | 5/2001 | Bernasconi et al. | ........ 358/474 |

* cited by examiner

Primary Examiner—Cheukfan Lee
(74) Attorney, Agent, or Firm—Troxell Law Office PLLC

(57) ABSTRACT

An adjustable chassis for variable brightness for a scanner includes a light source, a reflection means, a lens, a charge coupled device and a brightness adjuster. The brightness adjuster may be a reflection mirror adjuster which can change the angle of a first reflection mirror, or a lamp holder adjuster which can change the light emitting angle toward the scanning document, or a light source adjuster which can change the distance between the light source and the scanning document so that brightness on the document may be obtained at an optimum degree to achieve better scanning quality.

10 Claims, 14 Drawing Sheets

BRIGHTNESS ADJUSTABLE CHASSIS FOR A SCANNER

BACKGROUND OF THE INVENTION

1. Field of the Invention

This invention relates to an adjustable chassis for a scanner and particularly to an adjustable chassis with variable brightness for a charge coupled device to obtain an optimum image brightness to enhance scanning quality.

2. Description of the Prior Art

Scanner is a widely used peripheral device for a computer to capture and process document images. FIG. 1 shows a conventional scanner 1 which includes a chassis 12 for this purpose. FIG. 2 illustrates the detailed structure of the chassis in use. A document 2 is placed on a transparent document board 14 which is located above the chassis 12. The chassis 12 includes a light source 121, a reflection means 123, a lens 125 and a Charge Coupled Device (CCD) 127.

The light source 121 includes a lamp tube 1212 located in a curve-shaped chamber of a lamp holder 1214 for emitting light through a slot opening for scanning use. The length of the lamp tube 1212 is about the same of the width of the document board 14.

The reflection means 123 is to direct the image light of the document 2 to the lens 125. It generally includes at least one reflection mirror 1231.

The lens 125 is a condensing lens which receives image light from the reflection means 123 and forms a real image at its focal point.

The CCD 127 is located at the focal point of the lens 125 to receive and convert the image light to digital signals for a computer (not shown in the figures) to process.

It is generally known that the scanning quality of the scanner is highly depends on the brightness of the image light of the document 2 projecting upon the CCD 127. Brightness of the image light may be divided from 0 to 255 separated degrees with 0 represents least brightness and 255 represents most brightness. In general, brightness between 235 and 240 degree may result in best scanning quality. A chart in FIG. 2 shows relationship of document 2 brightness against the position of the document 2. The optimum brightness (i.e., between 235 and 240 degrees) may be obtained at a document displacement of about 5.5 mm.

However the chassis 12 usually has error more than 5.5 mm because of manufacturing problems and limitations. As a result, a conventional scanner rarely can provide the optimum brightness for the scanning document 2, and thus result in not desirable scanning quality.

The causes of this deficiency includes the following:

a. The quality of the lamp tube 1212 is not stable or consistent. The power rate of each lamp tube 1212 has different error when produced. The brightness which the document 2 receives from the lamp tube 1212 is thus also different.

b. The light projection angle of the lamp tube 1212 against the document 2 is different. Small projection angle produces greater brightness while large projection angle produces weaker brightness. Every scanner has slightly different projection angle due to human factor when assembling the light source 121 in the scanner 1. As a result, the brightness of the document 2 received is also different.

c. The reflection mirror 1231 has different reflecting angle resulting from human factor during assembly. This will also result in various brightness of image light reflecting by the reflection mirror 1231.

In order to resolve the brightness variance problem set forth above, there is a design as shown in FIG. 3, which includes a dimmer 322 in the light source 321. The dimmer 322 has a PLC (program logical circuit) to change the voltage of the light source 321 so that the brightness of the light source 321 may be changed from too high (such as the broken line C) or too low (such as the solid line A) to a desirable degree (dash line B). The addition of the dimmer 322 increases product complexity and cost. Furthermore it addresses only one of the factors mentioned above. Its effectiveness is thus not satisfactory.

SUMMARY OF THE INVENTION

In view of aforesaid disadvantages, it is therefore an object of this invention to provide a brightness adjustable chassis that includes a light source, a reflection means, a lens, a charge coupled device and a reflection mirror adjuster. While the construction of the chassis is largely like the conventional one set forth above, the reflection mirror adjuster may change the reflection angle of the reflection mirror so that the charge coupled device may received better brightness of light image to achieve better scanning quality.

It is another object of this invention to provide a brightness adjustable chassis that includes a light source, a reflection means, a lens, a charge coupled device and a lamp holder adjuster. The lamp holder adjuster may change the light projection angle of the light source upon the scanning document to obtain a desirable brightness for better scanning quality.

It is a further object of this invention to provide a brightness adjustable chassis that includes a light source, a reflection means, a lens, a charge coupled device and a light source adjuster. The light source adjuster may change the distance between the light source and the scanning document so that an optimum brightness may be obtained on the light image of the document for achieving better scanning quality.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENTS

Figure 1:
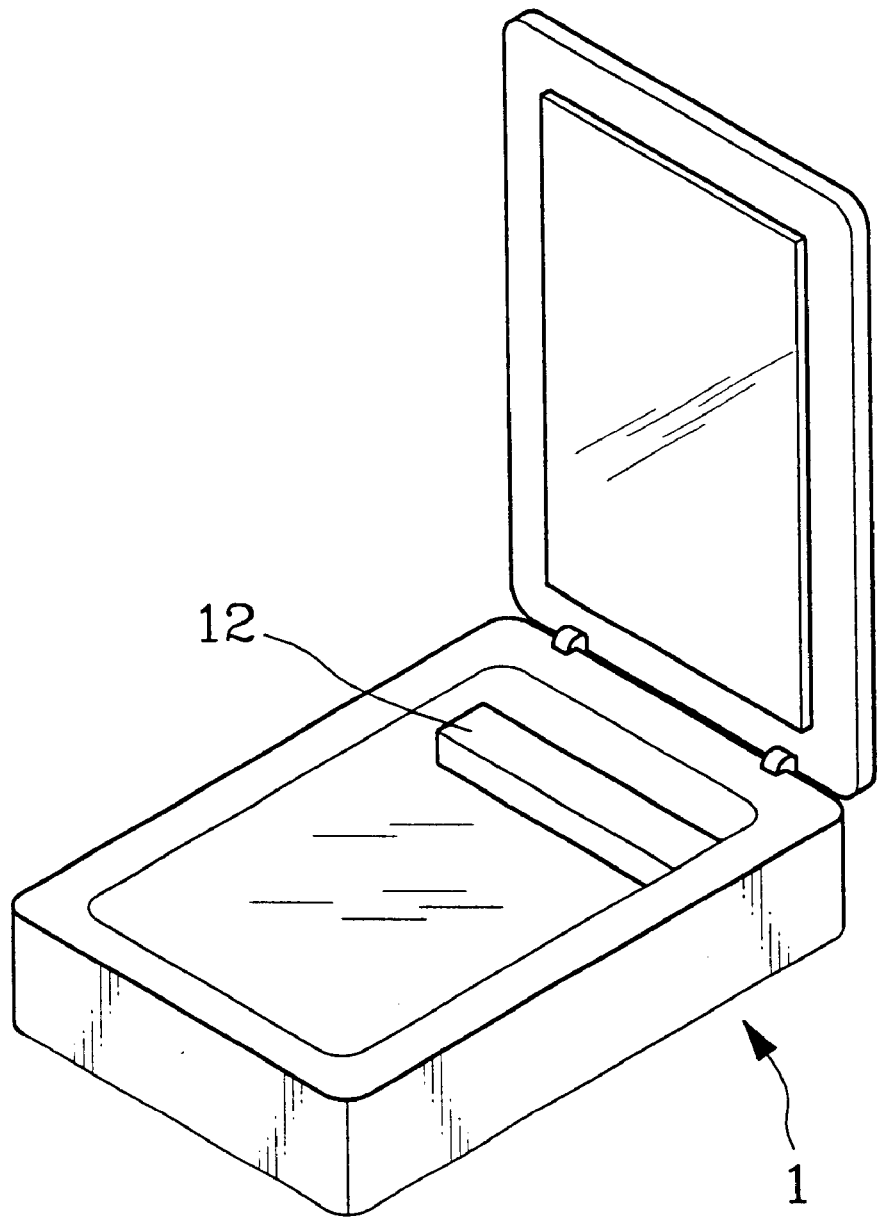
FIG. 1 is a pictorial view of a scanner.
Figure 2:
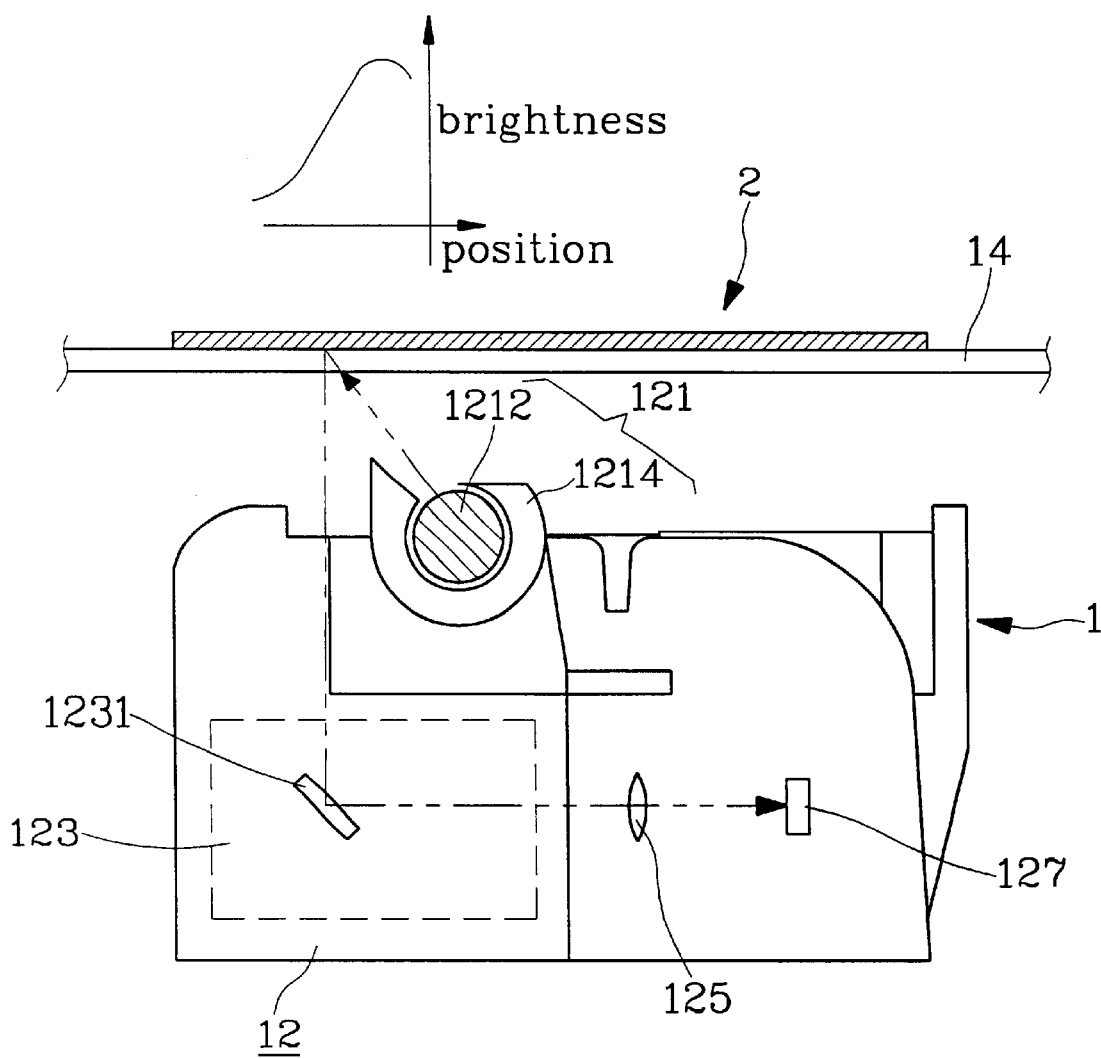
FIG. 2 is a fragmentary side view of a conventional chassis in a scanner.
Figure 3:
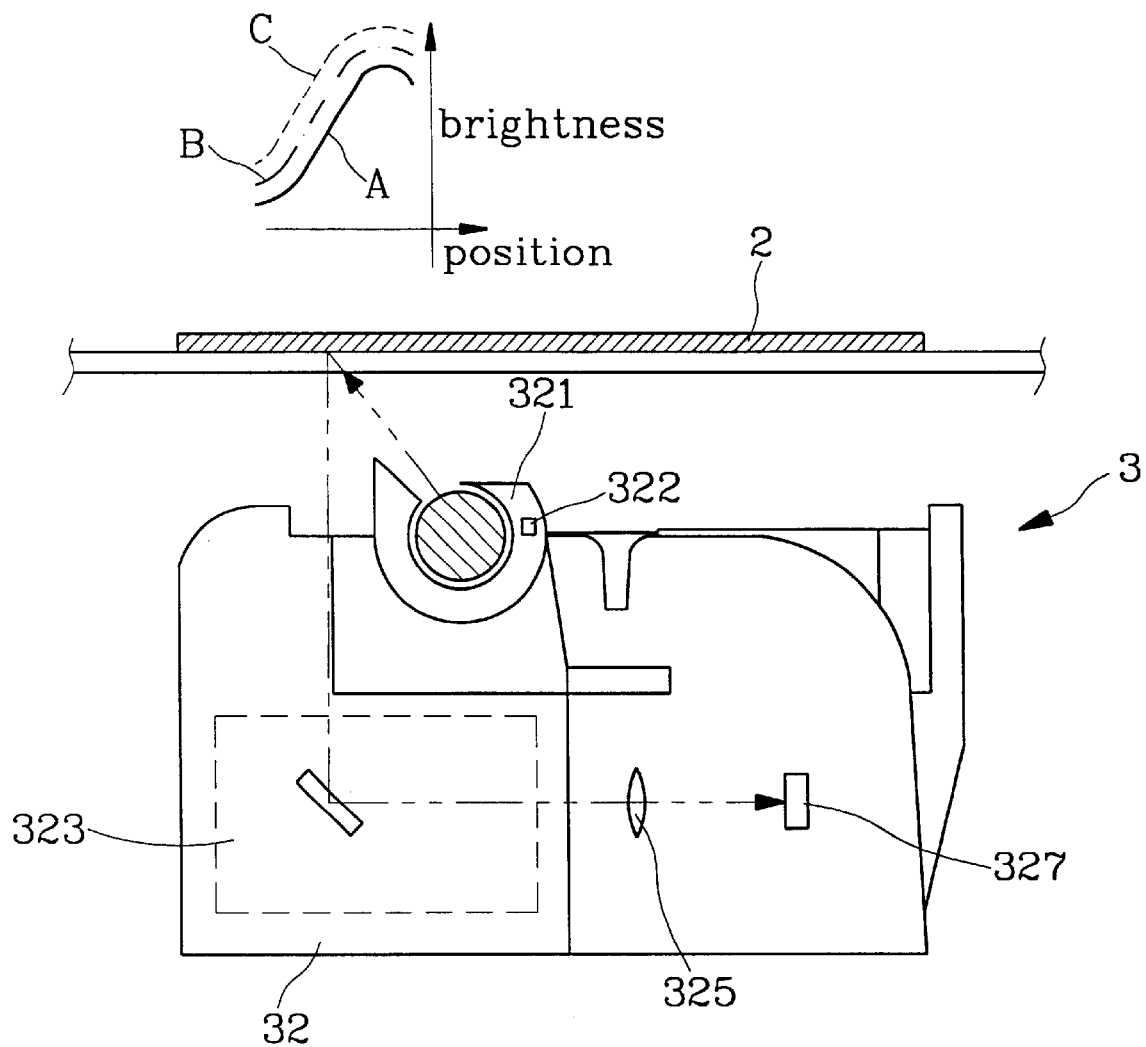
FIG. 3 is a fragmentary side view of a conventional chassis in a scanner, including a light source dimmer.
Figure 4:
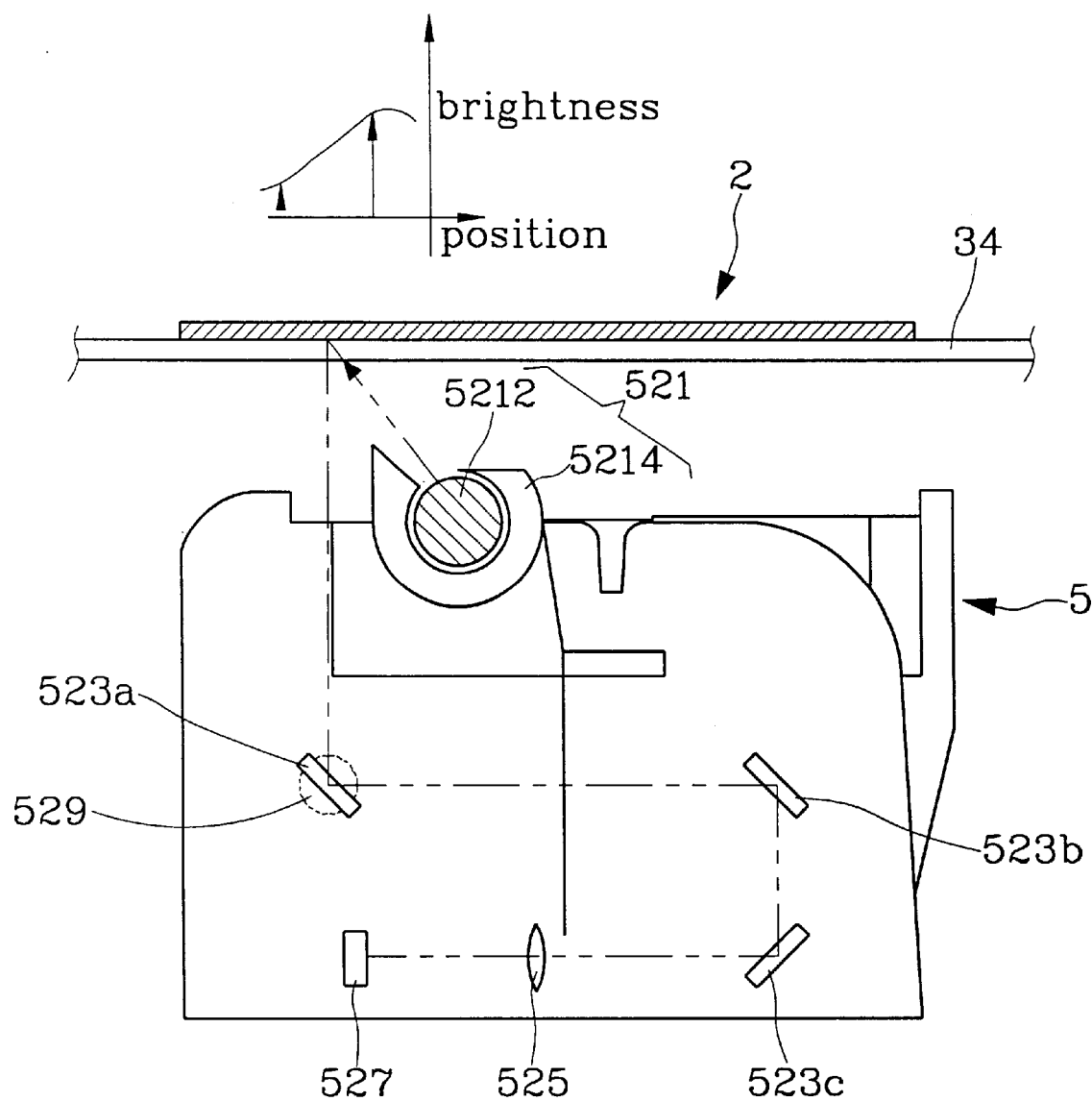
FIGS. 4A and 4B are respectively fragmentary side and sectional views of a first embodiment of a brightness adjustable chassis according to this invention.
FIGS. 4C and 4D are respectively fragmentary side views of the first embodiment of this invention in use.
Figure 4:
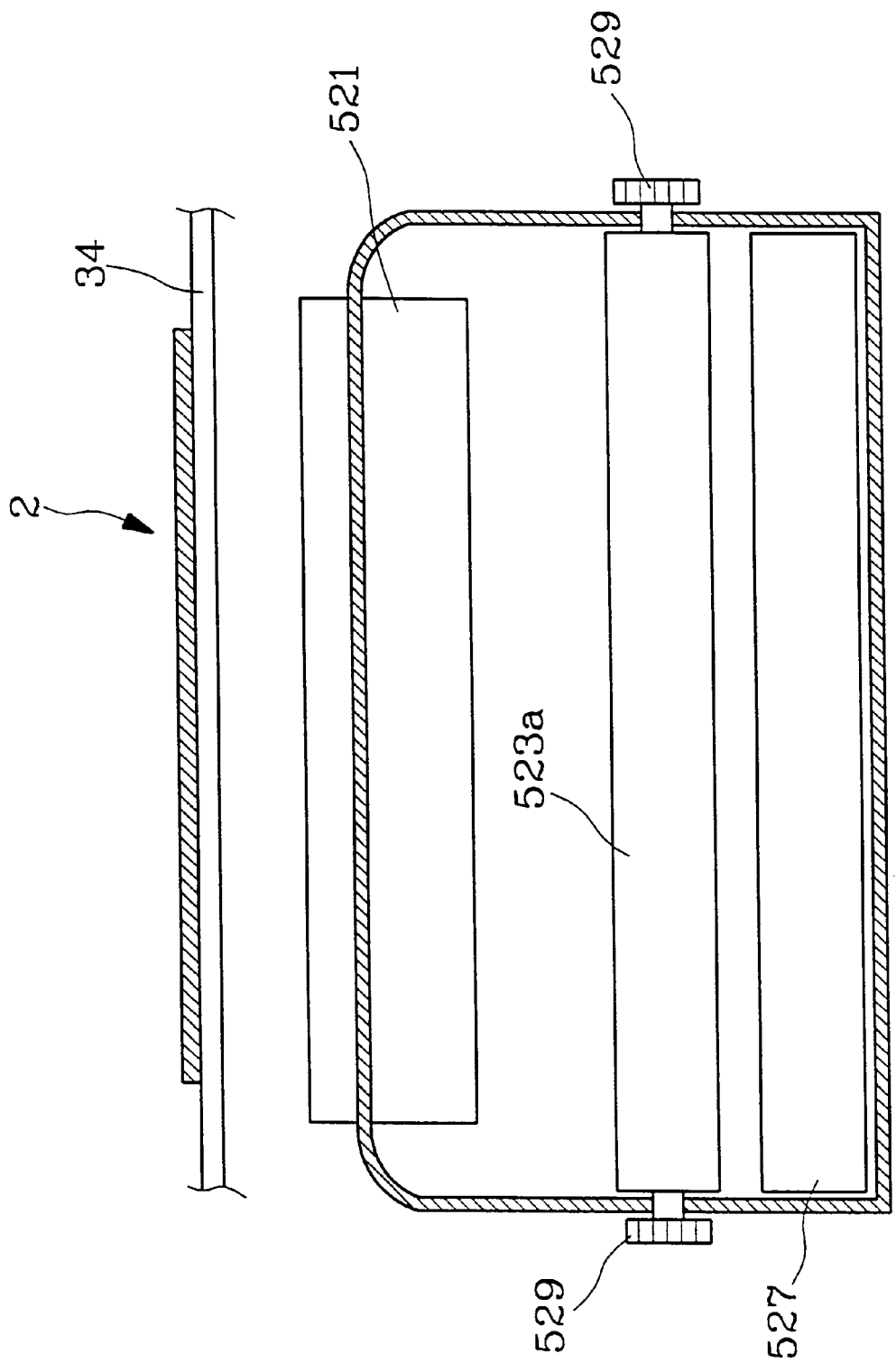
Figure 4:
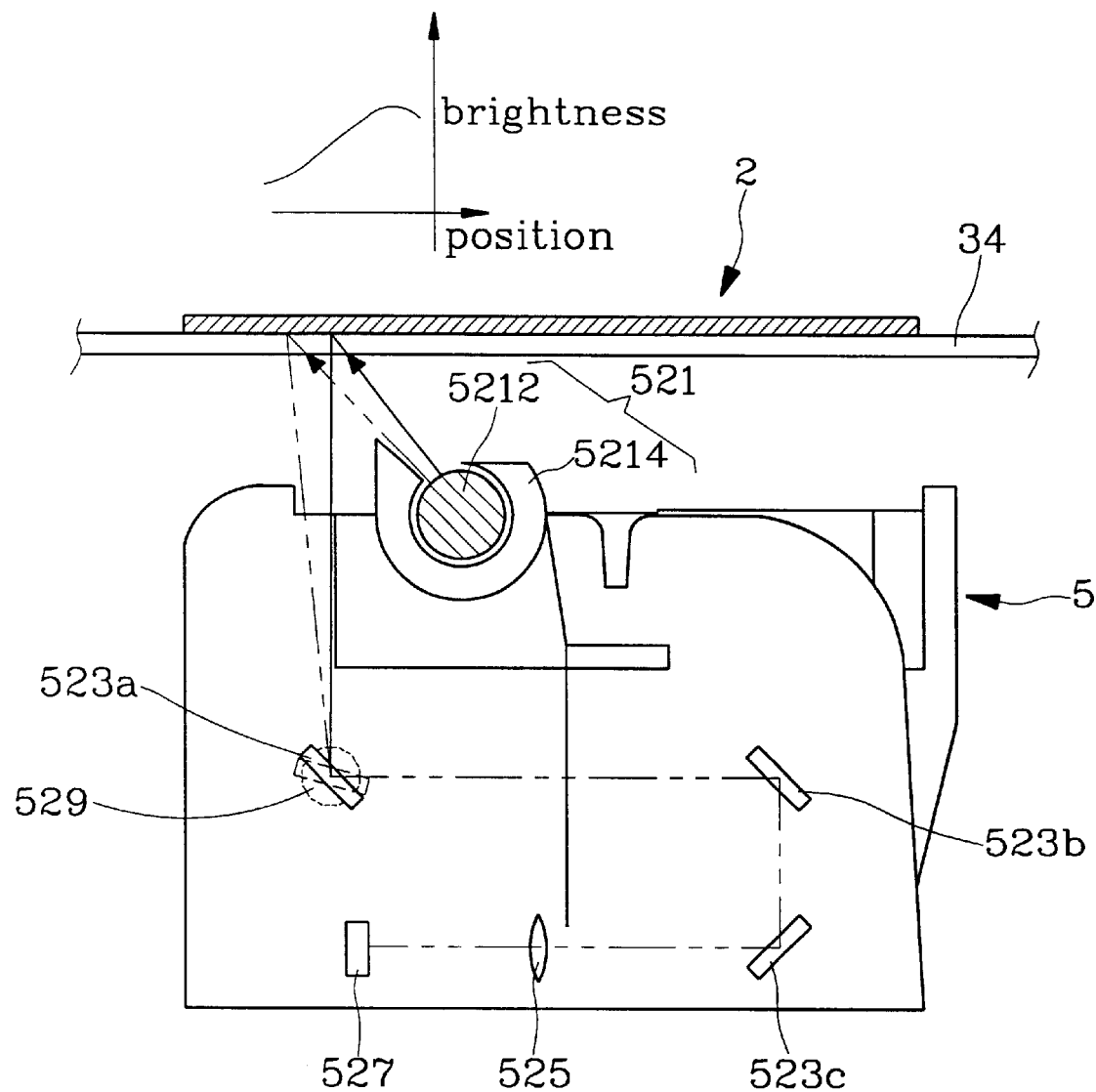
Figure 4:
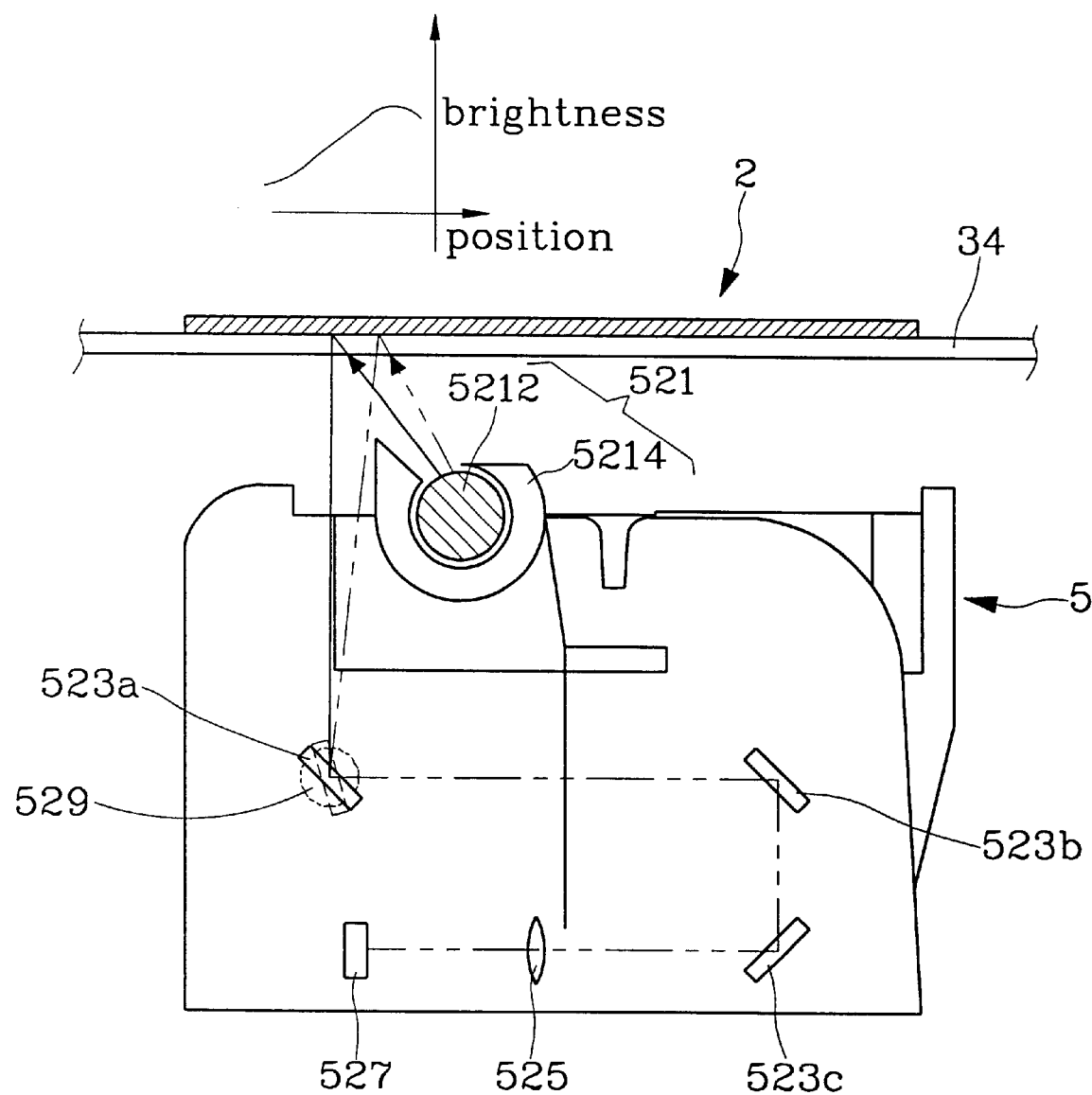

FIGS. 4A and 4B illustrate a first embodiment of this invention. The chassis 5 is housed in a scanner 3 (not shown in the figures) and is located below a document board 34. It includes a light source 521, a reflection means 523, a condensing lens 525, a charge coupled device (CCD) 527 and a reflection mirror adjuster 529. It is generally constructed like a conventional one shown in FIG. 2 with like components marked by like numerals except that the first numerals are '5's rather than "1"s. There are also two different features. One is that three reflection mirrors 523a, 523b and 523c are used in the reflection means instead of one reflection mirror 1231. Another difference is the addition of the reflection mirror adjuster 529 which is a modular part attached to a lateral side of the first reflection mirror 523a. The reflection means adjuster 529 has two round gears located respectively at two ends thereof to facilitate the turning of the adjuster 529. When light image of the document 2 has too low brightness (shown by broken lines in FIG. 4C), the reflection mirror adjuster 529 may be turned which in turns the first reflection mirror 523a to an angle desired to obtain a higher brightness (shown by solid lines in FIG. 4C) so that better scanning quality may be achieved. Vice versa is also true for adjusting too high brightness (as shown by broken lines in FIG. 4D) to a desirable brightness (shown by solid lines in FIG. 4D) for better scanning quality.

The reflection mirror adjuster 529 may be made of a plastic material and may be easily included in the chassis 5 without changing its structure. It is a lower cost solution than a conventional dimmer. It is also easy to use.

Figure 5:
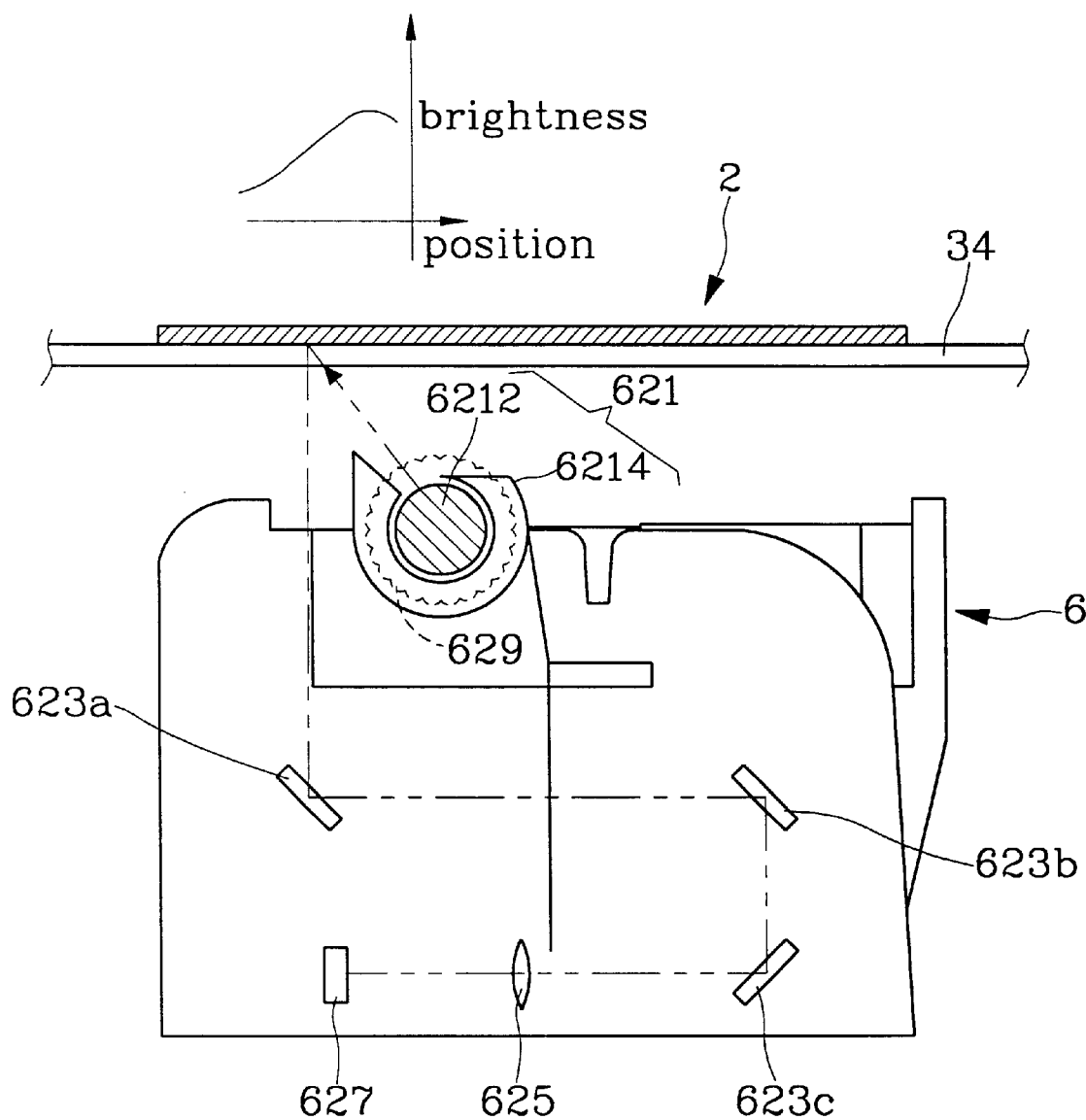
FIGS. 5A and 5B are respectively fragmentary side and sectional views of a second embodiment of a brightness adjustable chassis according to this invention.
FIGS. 5C and 5D are respectively fragmentary side views of the second embodiment according this invention in use.
Figure 5:
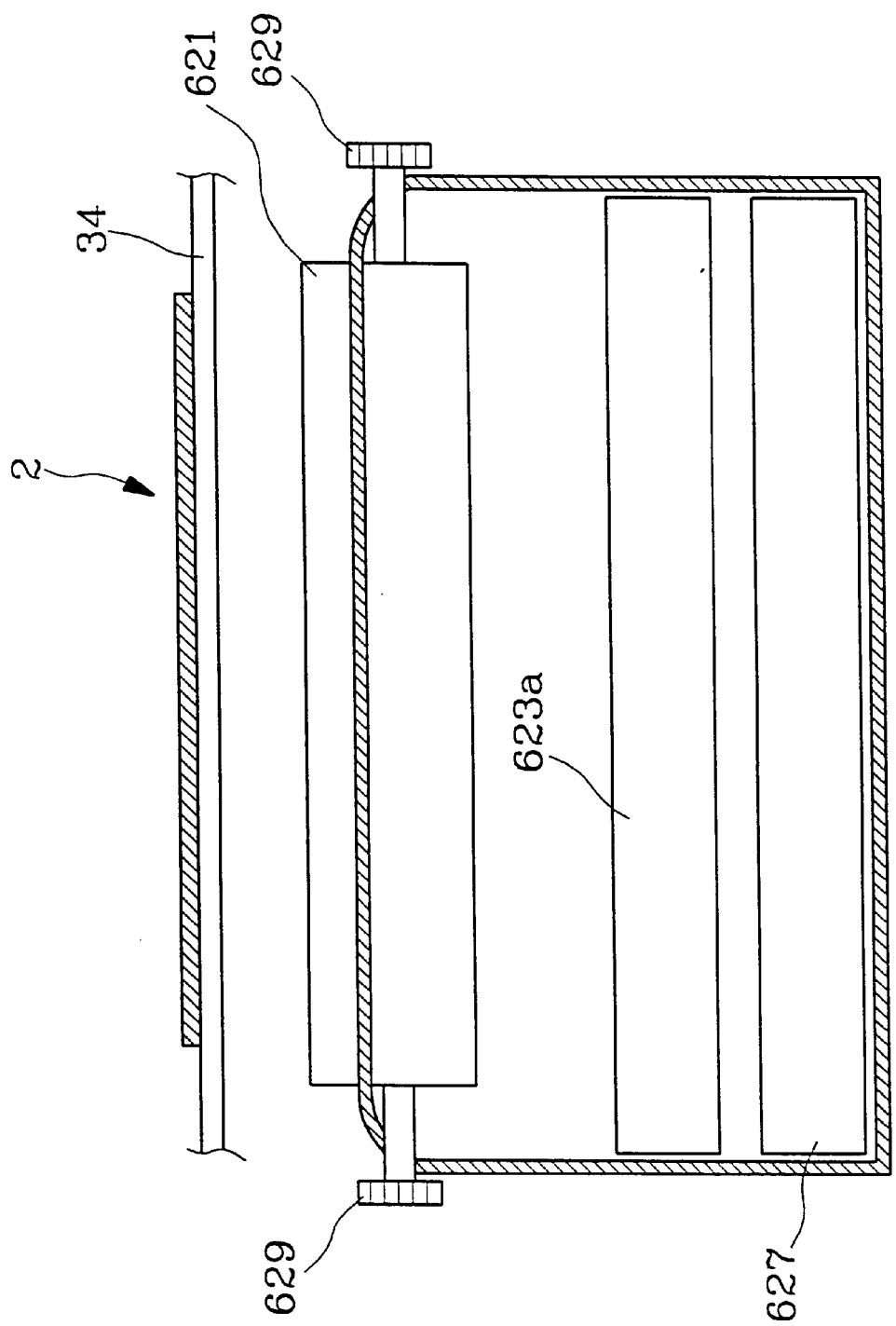
Figure 5C:
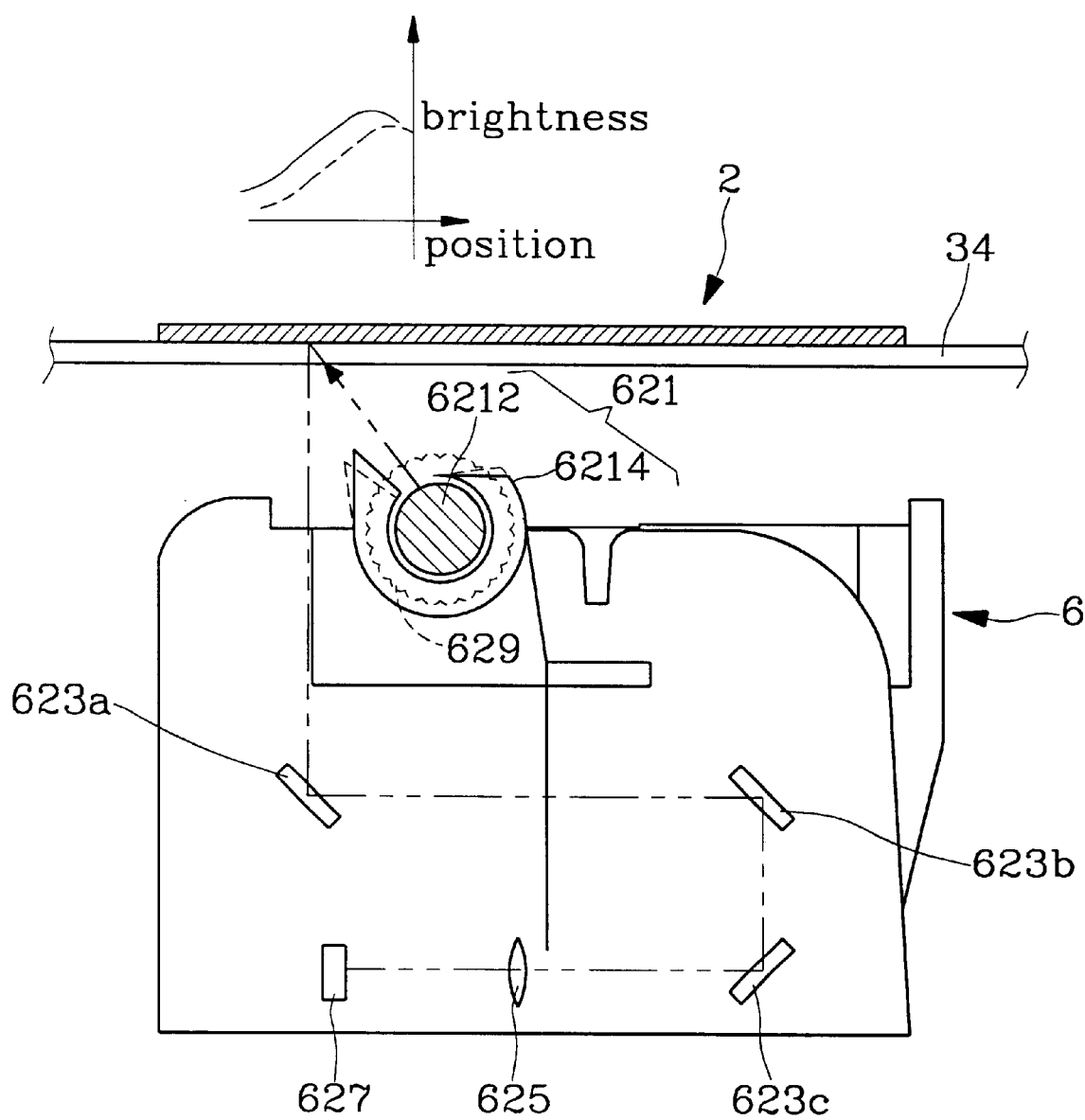
Figure 5D:
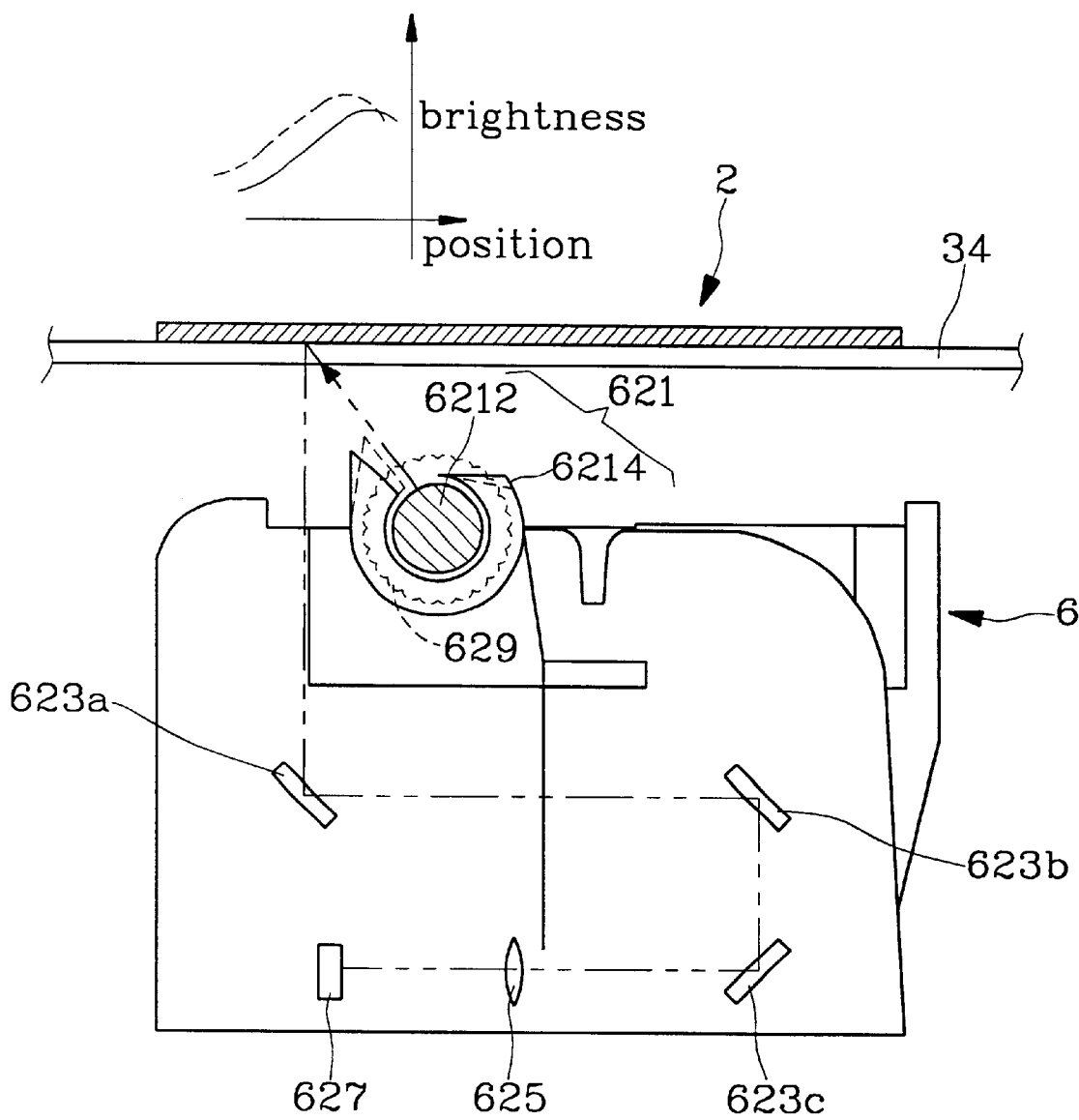

FIGS. 5A and 5B show a second embodiment of this invention. It is generally constructed like the first embodiment shown in FIG. 4A with like components marked by like numerals except that the first numerals are changed from "5"s to "6"s. Another difference is the addition of a lamp holder adjuster 629 (in the form of semi-circle curved chamber) while the reflection mirror adjuster 529 is dropped. The lamp holder adjuster 629 engages with the lamp holder 6214 and has two gears at two lateral ends thereof to facilitate turning of the lamp holder 6214. By turning the lamp holder adjuster 629, the lamp holder 6214 may also be turned in either direction, therefore light projecting direction from the lamp tube 6212 toward the document 2 may also be changed to obtain different degree of brightness desired. FIG. 5C shows turning the lamp holder adjuster 629 to increase brightness (from the broken line to the solid line in the chart), while FIG. 5D shows changing the brightness to a lower degree (from the broken line to the solid line in the chart).

Figure 6:
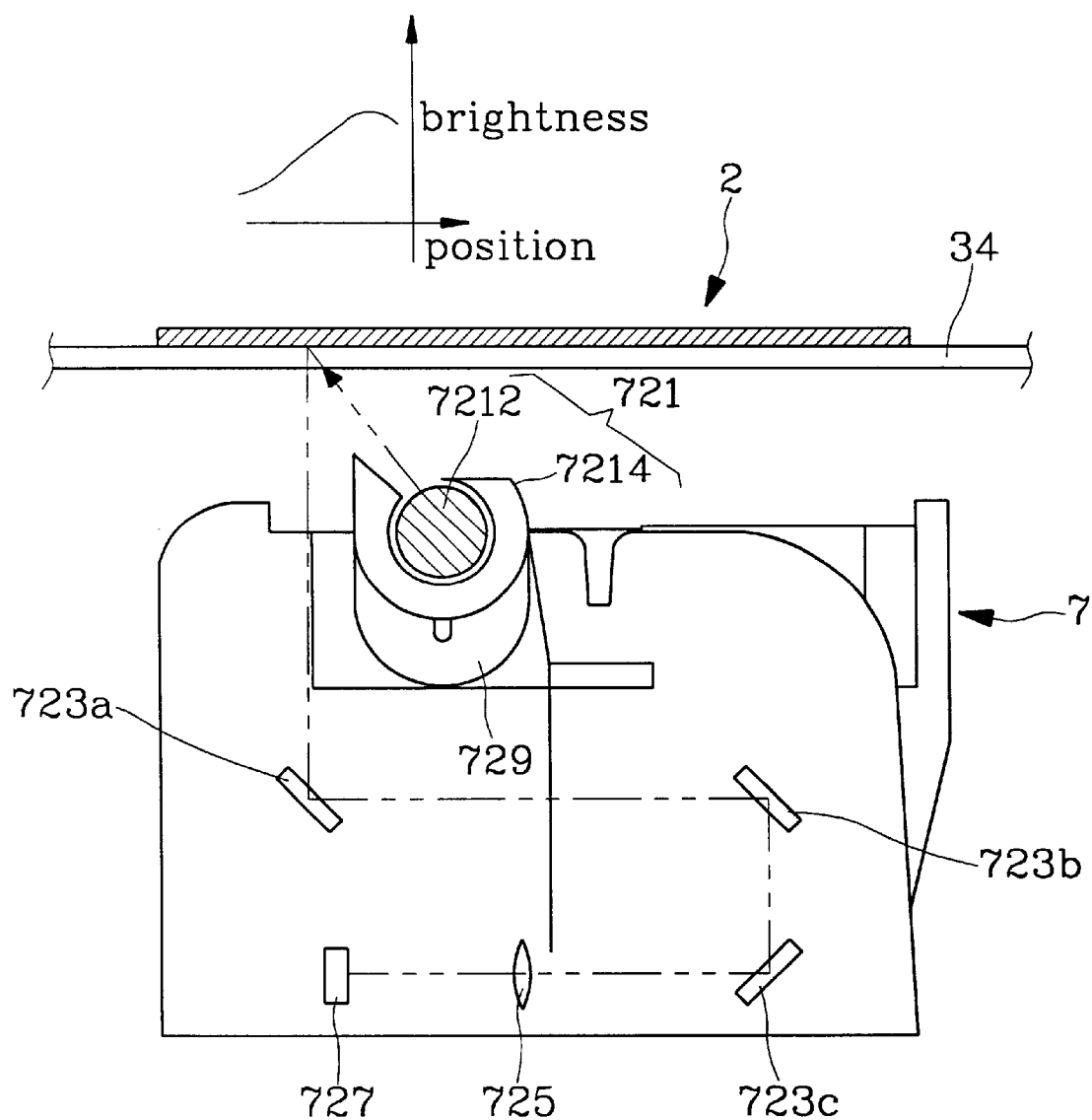
FIG. 6A is a fragmentary side and sectional view of a third embodiment of a brightness adjustable chassis according to this invention.
FIGS. 6B and 6C, are respectively fragmentary side views of the third embodiment according to this invention in use.
Figure 6:
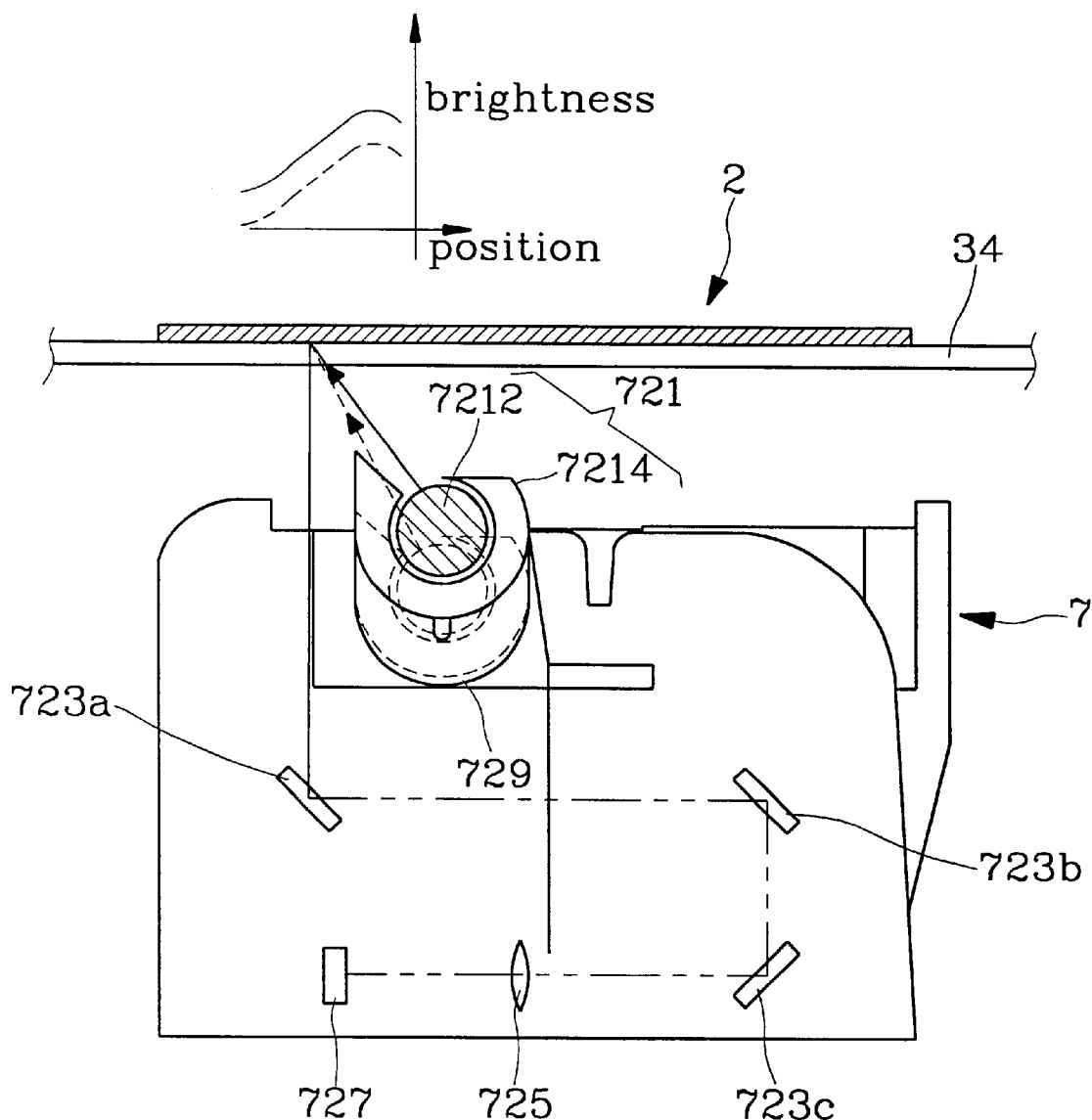
Figure 6:
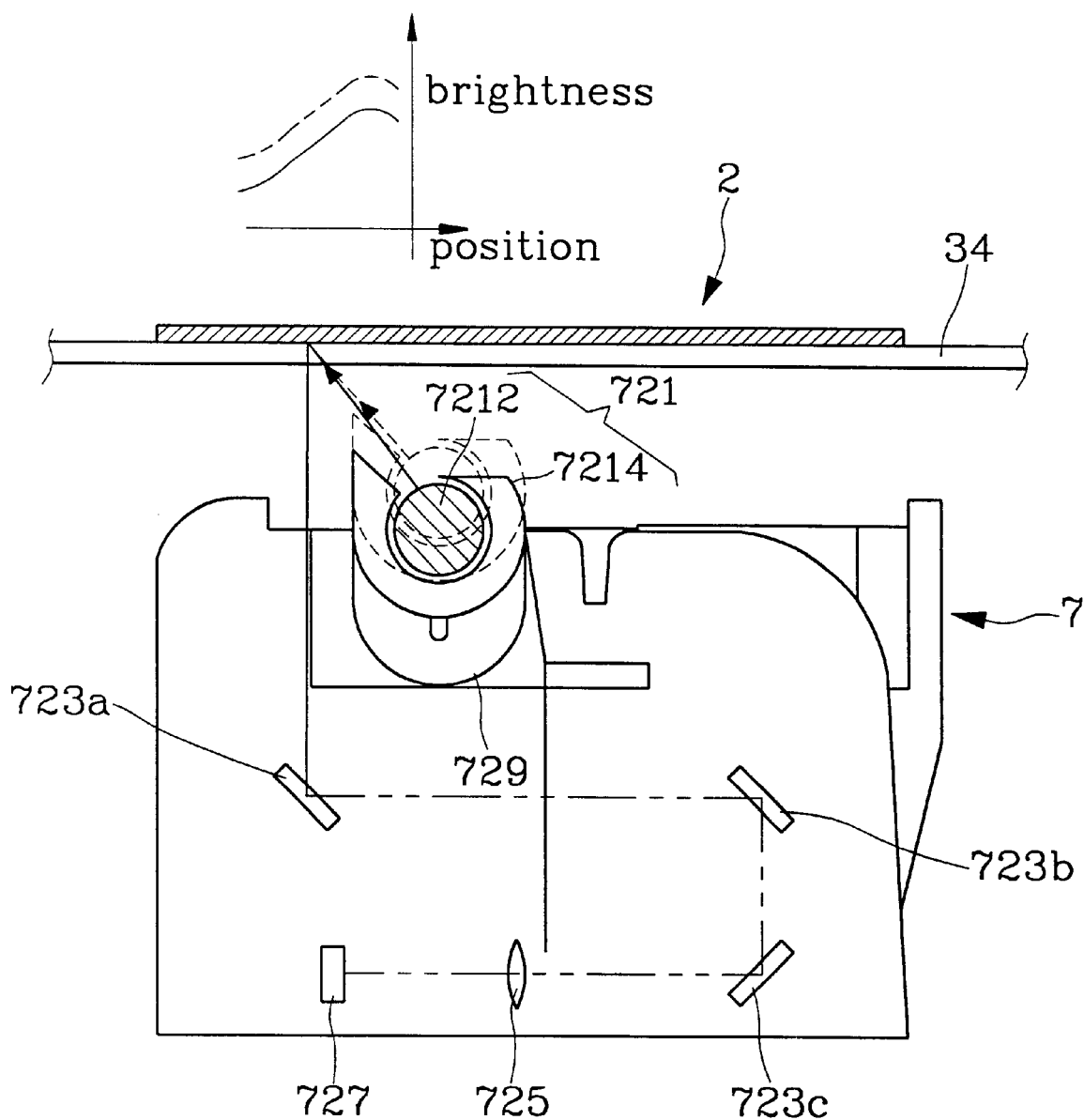

FIGS. 6A shows a third embodiment of this invention. It is generally constructed like the second embodiment shown in FIG. 5A with like components marked by like numerals except that the first numerals are changed from "6" to "7"s. However a light source adjuster 729 is added while the lamp holder adjuster 629 is omitted. The light source adjusted 729 is a modular part attached to the light source 721 and can move the light source 721 up or down to change the distance between the lamp tube 7212 and the document 2 to enable the document 2 getting different degree of brightness.

FIG. 6B illustrates such a scenario when the light source 721 is originally located at a lower position (broken line in FIG. 6B) and generates a lower degree of brightness (broken line in the chart) on the document 2 which is not satisfactory. By moving the light source adjuster 729, the light source 721 may be moved upward to shorten the distance between the lamp tube 7212 and the document 2 so that the brightness on the document 2 may be increased (from broken line to solid line in the chart). Then scanning quality may also be improved, while FIG. 6C shows changing the brightness to a lower degree (from the broken line to the solid line in the chart).

All the embodiments of this invention set forth above are simply structured and may be conveniently included in existing scanners without incurring a lot of structural change. It is low cost and also easy to use.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A brightness adjustable chassis for a scanner, comprising:
   a light source emitting light upon a document;
   a reflection device including at least one reflection mirror receiving image light from the document and directing the image light in a predetermined direction;
   a lens receiving the image light from the reflection device to form a real image on a focal point thereof;
   a charge coupled device receiving the real image; and
   a reflection mirror adjuster attached to one of the at least one reflection mirror for changing image light direction to obtain a desired image brightness for the charge coupled device, wherein the reflection mirror adjuster is a gear set made of plastic.

2. The brightness adjustable chassis of claim 1, wherein the reflection device includes three reflection mirrors made of stainless steel.

3. The brightness adjustable chassis of claim 1, wherein the reflection mirror adjuster and the attached reflection mirror are engaged to form a module.

4. The brightness adjustable chassis of claim 1, wherein the light source includes a lamp tube located in a lamp holder.

5. A brightness adjustable chassis for a scanner, comprising:
   a light source including a lamp tube located in a semi-circle curved chamber of a lamp holder which has a slot opening providing light for scanning a document;
   a reflection device including at least one reflection mirror receiving image light from the document and directing the image light in a predetermined direction;
   a lens receiving the image light from the reflection device to form a real image on a focal point thereof;
   a charge coupled device receiving the real image; and
   a lamp holder adjuster mounted on the lamp holder for changing a slot opening angle to control brightness of the image light on the document, wherein the lamp holder adjuster is a gear set made of plastic.

6. The brightness adjustable chassis of claim 5, wherein the reflection device includes three reflection mirrors made of stainless steel.

7. The brightness adjustable chassis of claim 5, wherein the lamp holder adjuster and the attached lamp holder are formed in a module.

8. A brightness adjustable chassis for a scanner, comprising:
- a light source for emitting upon a document;
- a reflection device including at least one reflection mirror receiving image light from the document and directing the image light in a predetermined direction;
- a lens receiving the image light from the reflection device to form a real image on a focal point thereof;
- a charge coupled device receiving the real image; and
- a light source adjuster attached to a side of the light source for changing a distance between the light source and the document to control brightness of the image light on the document, wherein the light source adjuster is made of plastic.

9. The brightness adjustable chassis of claim 8, wherein the reflection device includes three reflection mirrors made of stainless steel.

10. The brightness adjustable chassis of claim 8, wherein the light source adjuster and the reflection mirror are formed in a module.

* * * * *